United States Patent
Zanetto

(10) Patent No.: US 8,765,021 B2
(45) Date of Patent: Jul. 1, 2014

(54) AQUEOUS TREATMENT COMPOSITION FOR INHIBITING CORROSION AND ACID ATTACK ON METALLIC SURFACES

(75) Inventor: Jean-Emile Zanetto, Lyons (FR)

(73) Assignee: Rhodia Operations, Aubervilliers (FR)

( * ) Notice: Subject to any disclaimer, the term of this patent is extended or adjusted under 35 U.S.C. 154(b) by 894 days.

(21) Appl. No.: 12/937,002

(22) PCT Filed: Mar. 26, 2009

(86) PCT No.: PCT/EP2009/053620
§ 371 (c)(1),
(2), (4) Date: Nov. 9, 2010

(87) PCT Pub. No.: WO2009/124847
PCT Pub. Date: Oct. 15, 2009

(65) Prior Publication Data
US 2011/0049428 A1    Mar. 3, 2011

(30) Foreign Application Priority Data
Apr. 9, 2008   (FR) .................... 08 01949

(51) Int. Cl.
| | | |
|---|---|---|
| *C23F 11/16* | (2006.01) | |
| *C23F 11/167* | (2006.01) | |
| *F28G 9/00* | (2006.01) | |
| *C02F 5/12* | (2006.01) | |
| *B08B 9/027* | (2006.01) | |

(52) U.S. Cl.
USPC .......... 252/391; 252/79.2; 252/392; 252/402; 252/403; 510/247; 510/253; 106/14.42; 106/14.43; 134/22.14

(58) Field of Classification Search
USPC .............. 252/79.2, 391, 392; 510/247, 253
See application file for complete search history.

(56) References Cited

U.S. PATENT DOCUMENTS

| 2,913,416 A | 11/1959 | Fineman et al. | |
|---|---|---|---|
| 3,188,292 A | 6/1965 | Pirotte | |
| 3,294,695 A | 12/1966 | Tippett | |
| 3,312,625 A | 4/1967 | Peterson | |
| 3,262,912 A | 1/1968 | Chadwick et al. | |
| 5,817,885 A * | 10/1998 | Ricca et al. .................. | 568/612 |
| 2010/0240567 A1* | 9/2010 | Zanetto et al. ............... | 510/281 |
| 2012/0046212 A1* | 2/2012 | Bourdette et al. ........... | 510/206 |

FOREIGN PATENT DOCUMENTS

| DE | 2352630 | 4/1975 |
|---|---|---|
| EP | 1724375 | 11/2006 |
| FR | 1291340 | 4/1963 |
| FR | 1424950 | 1/1966 |
| WO | WO 9601245 | 1/1996 |
| WO | WO 9828249 | 7/1998 |
| WO | WO 0112765 | 2/2001 |

OTHER PUBLICATIONS

International Search Report; PCT/EP2009/053620; Jun. 29, 2009.

* cited by examiner

*Primary Examiner* — Joseph D Anthony
(74) *Attorney, Agent, or Firm* — Hunton & Williams LLP

(57) ABSTRACT

The present invention relates to an aqueous treatment composition for inhibiting corrosion and acid attack on metallic surfaces that comprises a thiourea organic derivative, a polyalkoxylated terpene nonionic surfactant and an acid. The invention also relates to a process for cleaning industrial metallic equipment, in particular heat exchangers in which a heat transfer fluid, generally based on air or on water, flows, with a view to cleaning them and removing scale and other soiling.

28 Claims, No Drawings

AQUEOUS TREATMENT COMPOSITION FOR INHIBITING CORROSION AND ACID ATTACK ON METALLIC SURFACES

CROSS-REFERENCE TO RELATED APPLICATIONS

This application is the U.S. National Phase of International Application No. PCT/EP2009/053620 filed on Mar. 26, 2009, which claims priority to French Application No. FR 0801949 filed Apr. 9, 2008.

FIELD OF THE INVENTION

The invention relates to an aqueous treatment composition for inhibiting corrosion and acid attack on metal surfaces. It also relates to a process for treating a metal surface by means of a composition according to the invention, in particular by acid pickling.

BACKGROUND

In most industrial sites, such as refineries, steelworks, mining facilities, bauxite treatment and the like, there are heat exchangers used to cool the equipment which operates according to cycles of varied temperatures, in which air or a heat-transfer fluid such as water circulates. The heat is evacuated by passing a fluid through pipes, generally made of steel or of an iron-based alloy.

Periodically, in order to prevent the accumulation of scale, soiling, sludge, algae, salts and various deposits in these pipes, an acid treatment composition is circulated in order to especially clean and, in particular, to dissolve the scale, followed by a second, alkaline solution in order to neutralize the residual acidity, before repeating a conventional exchanger cooling cycle.

Similarly, certain treatments for chemical pickling of metal surfaces are carried out by immersion in acid solutions.

In order to avoid corrosion of the steel by the acid solution, corrosion inhibitors are generally added to the acid treatment composition. Among them, thiourea derivatives, such as dialkylthioureas, are often used for their good stability at very low pH.

Other agents, for instance antifoams, in particular antifoam silicones, recommended for their good resistance to strongly acidic media, are also present most of the time in the treatment composition in order to avoid uncontrollable foam formations which would make the cleaning operations longer and more difficult.

However, the simultaneous presence of an antifoam and of an anti-corrosion agent of the thiourea type can, in certain cases, accelerate the corrosion of the metal surfaces, said corrosion being perceived through weight loss or the appearance of pitting on the surfaces, whereas this corrosion and therefore their weight loss is much less if the treatment composition contains only the thiourea derivative. However, in this case, the problem of the appearance of bothersome foams during the use of the treatment composition of course persists and one of the objectives of the present invention is precisely to propose a technical solution to the problem stated above.

SUMMARY OF THE INVENTION

This objective and others are achieved by means of the present invention, which in fact relates to an aqueous treatment composition for inhibiting corrosion and acid attack on metal surfaces, that comprises:
a) a thiourea organic derivative, and
b) a polyalkoxylated terpene nonionic surfactant.

DETAILED DESCRIPTION OF PREFERRED EMBODIMENTS

The polyalkoxylated terpene corresponds to formula (I) below:

$$Z-X-[(CH(R^5)-CH(R^6)-O)]_n[CH_2CH_2-O]_p-[CH(R^5)-CH(R^6)-O]_q-R^7 \quad (I)$$

in which formula:

Z represents a bicyclo[a,b,c]heptenyl or bicyclo-[a,b,c]heptyl radical, with $a+b+c=5$, $a=2$, 3 or 4, $b=2$ or 1, $c=0$ or 1, said radical being optionally substituted with at least one $C_1$-$C_6$ alkyl radical, and comprising a backbone Z selected from those indicated below, or the corresponding backbones, devoid of a double bond:

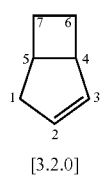
[3.2.0]

a)

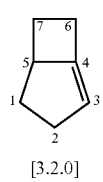
[3.2.0]

b)

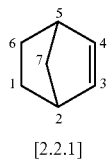
[2.2.1]

c)

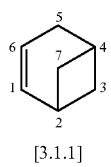
[3.1.1]

d)

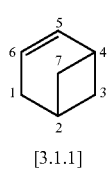
[3.1.1]

e)

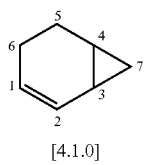

[4.1.0]

f)

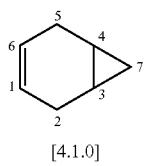

[4.1.0]

g)

X represents —CH$_2$—C(R$^3$)(R$^4$)—O— or —O—CH(R'$^3$)—C(R'$^4$)—O— in which:

R$^3$, R$^4$, R'$^3$ and R'$^4$, which may be identical or different, represent hydrogen or a linear, branched or cyclic, saturated or unsaturated, C$_1$-C$_{22}$, preferably C$_1$-C$_6$, hydrocarbon-based radical;

R$^5$ and R$^6$, which may be identical or different, represent hydrogen or a linear, branched or cyclic, saturated or unsaturated, C$_1$-C$_{22}$ hydrocarbon-based radical, on the condition that at least one of the radicals R$^5$ or R$^6$ is other than hydrogen;

R$^7$ represents hydrogen, or a linear, branched or cyclic, optionally aromatic, saturated or unsaturated, C$_1$-C$_{22}$ hydrocarbon-based radical which is optionally substituted (for example with an OH group);

n, p and q are numbers which are optionally integers, greater than or equal to 0, n+p+q>1, preferably from 2 to 200, preferably from 5 to 50.

Preferably, n, p and q are selected such that:
  n is a number, which is optionally an integer, between 2 and 10 inclusive;
  p is a number, which is optionally an integer, between 3 and 20 inclusive;
  q is a number, which is optionally an integer, between 0 and 30 inclusive.

A first type of compound is defined by formula (I) in which X is equal to —CH$_2$—C(R$^3$)(R$^4$)—O—.

Thus, this compound, hereinafter referred to as compound (Ia), corresponds to the following formula:

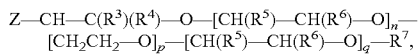

in which formula Z, R$^3$, R$^4$, R$^5$, R$^6$, R$^7$, n, p and q have the general meaning indicated previously.

Preferably, the radical Z is selected from the radicals of formulae c) to g).

It should be noted that the radical Z is more particularly attached to the rest of the chain by means of any one of the carbon atoms 1 to 6, the carbon atoms 1, 5 and 6 being preferred.

Moreover, the radical Z may be substituted, on at least one of its carbon atoms, with two C$_1$-C$_6$ alkyl radicals, preferably two methyl radicals.

More particularly, the carbon 7 is substituted with these two alkyl radicals, more specifically two methyls.

One of the preferred compounds used in the present invention therefore consists of a compound of which the radical Z corresponds to one of those appearing in figures c) to g), and more preferably, the radicals d) and e); the radical Z being substituted with two methyl radicals, located on the carbon 7.

Particularly preferably, the radical Z corresponds to formula d) or e), attached to the rest of the chain via the carbon 5 or 1, and bearing two methyl substituents on the carbon 7.

Preferably, R$^3$ and R$^4$, which may be identical or different, represent a hydrogen or a methyl radical. Preferably, R$^3$ and R$^4$ represent a hydrogen atom.

As was previously indicated, the radicals R$^5$ and R$^6$, which may be identical or different, represent hydrogen or a linear, branched or cyclic, saturated or unsaturated, C$_1$-C$_{22}$ hydrocarbon-based radical, on the condition that at least one of the radicals R$^5$ or R$^6$ is other than hydrogen.

More particularly, said radicals represent hydrogen or a C$_1$-C$_6$ alkyl radical, preferably the methyl radical or the ethyl radical, on the condition that at least one of these two radicals is other than hydrogen. Preferably, one of the radicals represents hydrogen, the other a methyl radical.

R$^7$ represents hydrogen, or a linear, branched or cyclic, optionally aromatic, saturated or unsaturated, C$_1$-C$_{22}$ hydrocarbon-based radical, which is optionally substituted, for example, with an OH group.

In the case where R$^7$ is a hydrocarbon-based radical, the latter is more particularly a C$_1$-C$_6$ alkyl radical, or an alkylphenyl radical, optionally substituted with a halogen (such as, for example, chlorine).

Preferably, R$^7$ is a hydrogen atom.

According to one particular embodiment of the present invention, the value of n is 3.

In addition, the value of p is more particularly between 6.2 and 7, limits included. Preferably, p is between 6.3 and 7, limits included.

According to another particular embodiment of the invention, n is between 4 and 5, limits included.

Furthermore, the value of p is preferably between 7, limit included, and 10, limit excluded, preferably between 8, limit included, and 10, limit excluded.

Preferably, q is equal to 0. If q is other than 0, then q is preferably between 5 and 25, limits included.

A second type of compound is defined by formula (I) in which X represents:

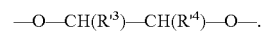

Thus, this compound, hereinafter referred to as compound (Ib), corresponds to the following formula:

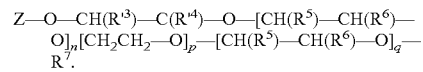

in which formula Z, R'$^3$, R'$^4$, R$^5$, R$^6$, R$^7$, n, p and q have the general meaning indicated previously.

According to one preferred embodiment of the invention, the radical Z corresponds to the radical c), the bicyclic compound not comprising a double bond.

Here again, it should be noted that the radical Z is more particularly attached to the rest of the chain by means of any one of the carbons 1 to 6. The carbon atoms 1, 3, 4 or 6 are more particularly selected.

Moreover, the radical Z may be substituted, on at least one of its carbon atoms, with two C$_1$-C$_6$ alkyl radicals, preferably two methyl radicals.

More particularly, the carbon 7 is substituted with these two alkyl radicals, more specifically two methyls.

Furthermore, the radical Z bears, on either of the carbon atoms 2 and 5, a C$_1$-C$_6$ alkyl substituent, preferably a methyl radical.

More particularly, and as mentioned previously, the radicals R'$^3$ and R'$^4$, which may be identical or different, represent hydrogen or a linear, branched or cyclic, saturated or unsaturated, $C_1$-$C_{22}$ hydrocarbon-based radical on the condition that one of the two is other than hydrogen.

According to one particular embodiment of the invention, said radicals represent hydrogen or a $C_1$-$C_6$ alkyl radical, preferably the methyl radical.

What has been indicated with respect to the radicals $R^5$, $R^6$ and $R^7$, and also with respect to the values of n, p and q and the preferred variants associated with these values, remains valid and will not be repeated again.

Incorporated in the family of products of formula (Ib), more particularly preferred are the products of formula:

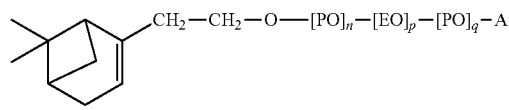

(Ib)

where:
A=H, $C_1$-$C_6$ alkyl, an aryl such as phenyl, a halogen atom, or a —$CH_2$—$CH(OH)R^7$ group, where $R^7$ represents a linear or branched $C_1$-$C_{22}$ alkyl group or an aryl radical, such as phenyl,
n is between 2 and 4,
P is between 3 and 20, and
q is between 5 and 20.
Preferably, A is a hydrogen atom.

In the compositions of the invention, it is particularly recommended to use, as polyalkoxylated terpene b), the products sold by the company Rhodia under the trade name Rhodoline® HP, the average chemical formula of which is included in general formula (Ib) above.

The concentration of polyalkoxylated terpene nonionic surfactant b) in the composition is generally 4 times less than the concentration of thiourea organic derivative a) in the composition. The concentration of polyalkoxylated terpene nonionic surfactant b) is therefore generally between 0.002% and 0.5%, preferably between 0.01% and 0.2% by weight.

The present invention has made it possible to demonstrate, surprisingly, not only that the polyalkoxylated terpene nonionic surfactant b) has an effective antifoam/defoaming effect in the treatment composition, but also that this surfactant, by virtue of an unexpected synergy effect, substantially increases the anti-corrosion action of the thiourea organic derivative a).

The compounds of formula (I) can be prepared by reacting: for obtaining compounds (Ia), a reactant of formula (IVa)

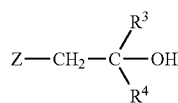

or for obtaining compounds (Ib), a reactant of formula (IVb)

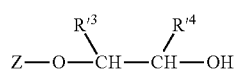

with, firstly, a reactant of formula (Vop)

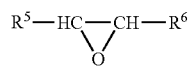

and then, secondly, with a reactant of formula (Voe)

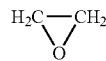

The radicals Z, $R^3$, $R^4$, $R^5$ and $R^6$ are as defined previously in formula (I).

The reaction can in addition be carried out in the presence of a catalyst.

Among suitable catalysts, mention may be made of strong bases, such as hydroxides of alkali metals, of alkaline earth metals or of quaternary ammoniums of $N(R)_4^+$ type, in which R, which may be identical or different, represent hydrogen or a $C_1$-$C_6$ alkyl radical, preferably methyl or ethyl. Sodium hydroxide, potassium hydroxide and tetramethylammonium hydroxide are suitable for carrying out this reaction.

Similarly, it is possible to use catalysts selected from alkali metal alkoxides or alkaline earth metal alkoxides, for instance sodium methoxide, ethoxide or tert-butoxide or potassium methoxide, ethoxide or tertbutoxide. It should be noted that it is also possible to use, as catalyst, primary, secondary or tertiary amines, preferably aliphatic amines, it being possible for these amines to comprise other functions, such as, in particular, ether functions. By way of example of a catalyst of this type, mention may be made of N,N-dimethyllaurylamine.

In the case of a basic catalyst, the amount is more particularly between 0.5 and 40 mg relative to the weight of final product.

It is possible to envision carrying out this reaction in the presence of a Lewis acid, such as $BF_3$ (gas or in solution in an ether), $SnCl_4$ or, $SbCl_5$.

The amount of acid catalyst ranges more particularly between 0.1 and 10 mmol per mole of reactant (IVa) or (IVb).

The bringing into contact is carried out at a temperature sufficient to allow the reaction to take place. By way of indication, the temperature is above 100° C., more particularly between 120 and 250° C., and preferably between 150 and 200° C.

Advantageously, the reaction is carried out under an atmosphere which is inert under the reaction conditions, such as nitrogen, or a rare gas such as argon or alternatively carbon monoxide. Nitrogen is preferred.

The reaction can take place under atmospheric pressure, under reduced pressure or at a slight overpressure. It is usually preferred to work under a pressure of between 1 and 4 bar.

The preparation of the reactants (IVa) and (IVb) has been described in application WO 96/01245, to which reference may be made.

The amounts of compounds (Vop) and (Voe) are calculated according to the characteristics of formula (I), more particularly the desired values of n and p.

These two compounds are introduced successively, so as to obtain a block compound of formula (I).

At the end of the reaction, the reaction mixture is preferably neutralized in order to obtain a pH of between 5 and 8, preferably 6 and 7.

The neutralization is carried out by means of acetic acid, sodium hydroxide, sodium carbonate or sodium bicarbonate, depending on the nature of the catalyst used in the reaction.

At the end of this reaction, the compound (I) is such that the radical $R^7$ is hydrogen.

It is entirely possible to carry out a step for functionalization of said radical, i.e. a step aimed at converting the end hydrogen into one of the other radicals $R^7$, as defined previously. Thus, an operation for etherification or esterification of the end hydrogen atom can be carried out; this step is well known in itself; it is preferably carried out after the neutralization.

Thus, it is possible to prepare alkyl ethers ($R^7$=hydrocarbon-based radical), according to the procedure described in U.S. Pat. No. 2,913,416.

More detailed information concerning these methods of functionalization are described in publication WO 96/01245.

The thiourea organic derivative a) preferably corresponds to general formula (II):

$$S=C(NR_{11}R_{12})(NR_{13}R_{14}) \quad (II)$$

in which $R_{11}$, $R_{12}$, $R_{13}$ and $R_{14}$, which may be identical or different, represent a hydrogen atom or a linear, branched or cyclic, saturated or unsaturated, $C_1$-$C_{22}$, preferably $C_1$-$C_6$, hydrocarbon-based radical, with the proviso that $R_{11}$, $R_{12}$, $R_{13}$ and $R_{14}$ cannot simultaneously represent a hydrogen atom.

The preferred thiourea organic derivatives are, in particular, the 1,3-dibutyl thiourea sold by Rhodia under the trade name Stannine 5525®, 1,3-diethyl thiourea, 1,3-propyl thiourea, 1,3-dicyclohexyl thiourea and cyclohexyl 2-thiourea. In the context of the present invention, Stannine 5525® from Rhodia (dibutyl thiourea) is particularly recommended.

The concentration of thiourea organic derivative a) in the composition is generally between 0.01% and 2%, preferably between 0.02% and 0.1% by weight.

The acid c) which makes it possible to bring the pH of the composition to a value conventionally between 0.1 and 3, preferably between 0.5 and 2.5, is preferably selected from strong inorganic acids, preferably sulfuric acid, phosphoric acid, hydrochloric acid and nitric acid. The concentration of acid in the composition is generally between 0.1% and 30%, preferably between 5% and 20% by weight.

The composition according to the invention may also comprise:
d) another surfactant.
The surfactant d) is advantageously selected from di-N-substituted polyalkoxy condensates of tertiary amines,
di-N-substituted polyalkoxy condensates of amides, alkyl ether sulfates,
nonylphenol propylene oxide and/or ethylene oxide condensates,
ampholytic surfactants, and
ethanolamines.

The present invention is also directed toward a process for treating metal surfaces, characterized in that said surfaces are brought into contact with a treatment composition as defined above. This process can comprise a subsequent step consisting of another treatment, such as, for example, a galvanization.

According to one particular embodiment of the process, and with the purpose of cleaning metal circuits of heat exchangers, a cleaning composition as defined above is circulated in said circuits at a speed of at least one meter per second for a period of time sufficient to remove the scale and other types of soiling, generally between 30 minutes and 3 hours, and then, if necessary, the acid is neutralized by circulating water or water supplemented with a base, generally caustic soda.

The following examples illustrate the invention without limiting the scope thereof.

EXAMPLE 1

A control composition, which is an aqueous solution containing 10% by weight of $H_2SO_4$ and comprising no other additive, is prepared.

A composition 1 is prepared, comprising: an aqueous solution containing 10% by weight of $H_2SO_4$, 0.1% by weight of dibutylthiourea sold by the company Rhodia under the trade name Stannine 5525®.

A composition 2 is prepared, which is identical to composition 1 except that it also comprises 50 ppm of an antifoam silicone sold by the company Rhodia under the trade name Rhodorsil 414®.

A composition 3 is prepared, which is identical to composition 1 except that it also comprises 0.02% by weight of polyalkoxylated terpene nonionic surfactant b) sold by the company Rhodia under the trade name Rhodoline® HP.

Steel tubes approximately 40 mm in diameter and 3 mm thick, cut in half lengthwise and the cross sections of which are not protected against corrosion, are immersed in each of the compositions described above and brought to 35° C., for predetermined periods of immersion, and the weight losses of the tubes are measured after each of the periods, as % losses by weight.

The results, obtained are given in table 1 below:

TABLE 1

| | % losses by weight | | | | | |
|---|---|---|---|---|---|---|
| Control composition | 0.13 | 5 | 12 | 13 | — | — |
| Composition 1 | 0.07 | 0.09 | 0.35 | 0.90 | 1.1 | 3 |
| Composition 2 | 0.08 | 0.1 | 0.30 | 0.75 | 0.85 | 0.9 |
| Composition 3 | 0.07 | 0.09 | 0.30 | 0.75 | 0.85 | 0.9 |
| Immersion period (h) | 0 | 50 | 100 | 150 | 200 | 250 |

From the table it emerges that a cleaning composition containing only the thiourea derivative caused % losses by weight that were too great given that losses are considered to be tolerable when they do not exceed 1% by weight.

EXAMPLE 2

Demonstration of the synergy that exists between the thiourea derivative and the polyalkoxylated terpene nonionic surfactant Compositions 1, 2 and 3 of example 1 above are used, and composition 4, which is identical to composition 1 except that the Stannine 5525® content is 0.2% by weight, is prepared.

Steel tubes approximately 40 mm in diameter and 3 mm thick, cut in half lengthwise and the cross sections of which are not protected against corrosion, are immersed in each of compositions 1, 2, 3 and 4 described above and brought to 35° C., for 27 days of immersion, and at the end of these 27 days, the weight losses of the tubes are measured as % losses by weight.

The results are given in table 2 below:

TABLE 2

| | % losses by weight after 27 days |
|---|---|
| Composition 1 | 12 |
| Composition 2 | 26 |
| Composition 3 | 4 |
| Composition 4 | 9 |

From table 2 it emerges that the Stannine®/Rhodoline® combination exhibits, through synergy, an anticorrosion action that is greater than with the use of Stannine® alone, even used at a dose which is twice as high.

The invention claimed is:

1. A composition comprising:
   a thiourea organic derivative,
   a polyalkoxylated terpene nonionic surfactant, and
   water.

2. The composition of claim 1, further comprising:
   an acid,
      wherein the pH of the composition including the acid ranges from 0.1 to 3.

3. The composition of claim 1, further comprising:
   an additional surfactant.

4. The composition of claim 2, further comprising:
   an additional surfactant.

5. The composition of claim 2, wherein the pH of the composition ranges from 0.5 to 2.5.

6. The composition of claim 1, wherein the polyalkoxylated terpene nonionic surfactant comprises a compound of formula:

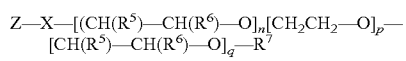

wherein:
   Z comprises a bicyclo[a,b,c]heptenyl or bicyclo[a,b,c]heptyl radical,
   wherein:

$a+b+c=5$, a=2, 3 or 4,
   b=2 or 1, and
   c=0 or 1;

X represents $-CH_2-C(R^3)(R^4)-O-$ or $-O-CH(R'^3)-C(R'^4)-O-$,
wherein:
   $R^3$, $R^4$, $R'^3$ and $R'^4$, which may be identical or different, represent hydrogen or a linear, branched, or cyclic, saturated or unsaturated, $C_1$-$C_{22}$;
   $R^5$ and $R^6$, which may be identical or different, represent hydrogen or a linear, branched, or cyclic, saturated or unsaturated, $C_1$-$C_{22}$ hydrocarbon-based radical, provided that at least one of the radicals $R^5$ or $R^6$ is not a hydrogen;
   $R^7$ represents hydrogen, or a linear, branched, or cyclic, optionally aromatic, saturated or unsaturated, $C_1$-$C_{22}$ hydrocarbon-based radical that is optionally substituted;
   n, p and q are numbers, optionally integers, that are greater than or equal to 0,
   wherein n+p+q>1.

7. The composition of claim 6, wherein said radical Z comprises a backbone of formula:

a)
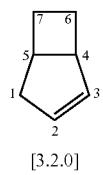
[3.2.0]

b)
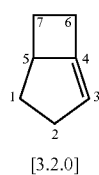
[3.2.0]

c)
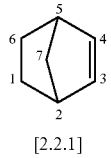
[2.2.1]

d)
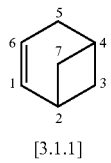
[3.1.1]

e)
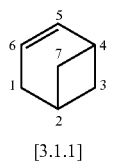
[3.1.1]

f)
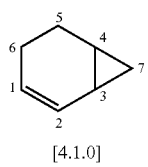
[4.1.0]

g)
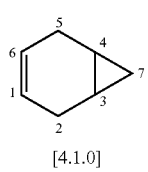
[4.1.0]

or a corresponding backbone without a double bond.

8. The composition of claim 6, wherein said radical Z is substituted with at least one $C_1$-$C_6$ alkyl radical.

9. The composition of claim 6, wherein $R^3$, $R^4$, $R'^3$ and $R'^4$ represent hydrogen or a linear, branched, or cyclic, saturated or unsaturated, $C_1$-$C_6$, hydrocarbon-based radical.

10. The composition of claim 6, wherein n+p+q equals a number ranging from 2 to 200.

11. The composition of claim 10, wherein:
n is a number ranging from 2 to 10;
p is a number ranging from 3 to 20; and
q is a number ranging from 0 to 30.

12. The composition of claim 1, wherein the polyalkoxylated terpene nonionic surfactant comprises a compound of formula:

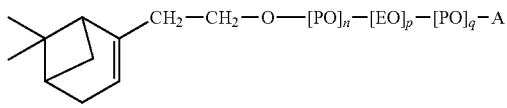

wherein:
A comprises a hydrogen, a $C_1$-$C_6$ alkyl, an aryl, a halogen atom, or a —$CH_2$—$CH(OH)R^7$ group, wherein $R^7$ represents a linear or branched $C_1$-$C_{22}$ alkyl group or an aryl radical;
n ranges from 2 to 4;
p ranges from 3 to 20; and
q ranges from 5 to 20.

13. The composition of claim 12, wherein A is a hydrogen atom.

14. The composition of claim 1, wherein the thiourea organic derivative comprises a compound of formula:

wherein $R_{11}$, $R_{12}$, $R_{13}$ and $R_{14}$, which may be identical or different, comprise a hydrogen atom or a linear, branched, or cyclic, saturated or unsaturated, hydrocarbon-based radical, provided that $R_{11}$, $R_{12}$, $R_{13}$ and $R_{14}$ do not simultaneously represent a hydrogen atom.

15. The composition of claim 14, wherein the thiourea organic derivative comprises a 1,3-dibutyl thiourea, a 1,3-diethyl thiourea, a 1,3-propyl thiourea, a 1,3-dicyclohexyl thiourea, or a cyclohexyl-2-thiourea.

16. The composition of claim 15, wherein the thiourea organic derivative comprises a 1,3-dibutyl thiourea.

17. The composition of claim 3, wherein the additional surfactant comprises:
a di-N-substituted polyalkoxy condensate of a tertiary amine,
a di-N-substituted polyalkoxy condensate of an amide,
an alkyl ether sulfate,
a nonylphenol propylene oxide condensate,
an ethylene oxide condensate,
an ampholytic surfactant,
an ethanolamine, or
a combination thereof.

18. The composition of claim 1, wherein the concentration of thiourea organic derivative ranges from 0.01% to 2% and the concentration of polyalkoxylated terpene nonionic surfactant ranges from 0.002% to 0.5%.

19. The composition of claim 18, wherein the concentration of thiourea organic derivative ranges from 0.02% and 0.1% and the concentration of polyalkoxylated terpene nonionic surfactant ranges from 0.01% and 0.2%.

20. The composition of claim 2, wherein the acid comprises a strong inorganic acid.

21. The composition of claim 20, wherein the acid comprises
sulfuric acid,
phosphoric acid,
hydrochloric acid,
nitric acid, or
a combination thereof.

22. The composition of claim 2, wherein the concentration of the acid ranges from 0.1% to 30% by weight.

23. The composition of claim 22, wherein the concentration of the acid ranges from 5% to 20% by weight.

24. A process for treating a metal surface, comprising contacting said surface with a composition comprising:
a thiourea organic derivative, and
a polyalkoxylated terpene nonionic surfactant.

25. A process for cleaning a metal circuit of a heat exchanger, comprising:
circulating in said circuit a composition comprising:
a thiourea organic derivative, and
a polyalkoxylated terpene nonionic surfactant,
wherein said composition is circulated at a speed of at least one meter per second for a period of time effective to remove scale and/or other types of soiling.

26. The process of claim 25, wherein the circulation time ranges from 30 minutes to 3 hours.

27. The process of claim 25, wherein said composition further comprises an acid and said acid is neutralized after the circulation step by circulating water or water supplemented with a base.

28. The process of claim 27, further comprising galvanizing said metal circuit after the circulation and neutralization steps.

* * * * *